US010114110B2

(12) United States Patent
Imai

(10) Patent No.: US 10,114,110 B2
(45) Date of Patent: Oct. 30, 2018

(54) OBJECT DETECTING DEVICE, SENSING DEVICE, AND MOBILE OBJECT DEVICE

(71) Applicant: Shigeaki Imai, Kanagawa (JP)

(72) Inventor: Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 276 days.

(21) Appl. No.: 15/069,286

(22) Filed: Mar. 14, 2016

(65) Prior Publication Data
US 2016/0274223 A1    Sep. 22, 2016

(30) Foreign Application Priority Data

Mar. 18, 2015  (JP) .................................. 2015-055314

(51) Int. Cl.
| | |
|---|---|
| *G01C 3/08* | (2006.01) |
| *G01S 7/481* | (2006.01) |
| *G01S 17/42* | (2006.01) |
| *G01S 17/93* | (2006.01) |
| *G01S 7/497* | (2006.01) |

(52) U.S. Cl.
CPC .......... *G01S 7/4817* (2013.01); *G01S 7/4815* (2013.01); *G01S 7/4972* (2013.01); *G01S 17/42* (2013.01); *G01S 17/936* (2013.01)

(58) Field of Classification Search
CPC .... G01S 7/4817; G01S 7/4815; G01S 7/4972; G01S 17/42; G01S 17/936
See application file for complete search history.

(56) References Cited

U.S. PATENT DOCUMENTS

| | | | |
|---|---|---|---|
| 5,760,886 A | 6/1998 | Miyazaki et al. | |
| 5,870,181 A | 2/1999 | Andressen | |
| 6,301,003 B1 | 10/2001 | Shirai et al. | |
| 2006/0132752 A1 | 6/2006 | Kane | |
| 2006/0227317 A1 | 10/2006 | Henderson et al. | |
| 2007/0076186 A1* | 4/2007 | Miyazaki ................ | G01S 17/42 356/3.1 |
| 2014/0009747 A1 | 1/2014 | Suzuki et al. | |
| 2014/0034817 A1 | 2/2014 | Nakamura et al. | |
| 2014/0036071 A1 | 2/2014 | Nakamura et al. | |
| 2014/0209793 A1 | 7/2014 | Nakamura et al. | |

(Continued)

FOREIGN PATENT DOCUMENTS

| | | |
|---|---|---|
| JP | 2009-063339 | 3/2009 |
| JP | 2009-069003 | 4/2009 |

(Continued)

OTHER PUBLICATIONS

Extended European Search Report dated Jul. 25, 2016 in Patent Application No. 16160452.5.

*Primary Examiner* — Samantha K Abraham
(74) *Attorney, Agent, or Firm* — Oblon, McClelland, Maier & Neustadt, L.L.P.

(57) ABSTRACT

An object detecting device includes: a light source which includes a plurality of light emitting units arranged in a sub-scanning direction; a deflector which deflects light from the light source; and an optical detector which includes a plurality of light receiving units arranged in the sub-scanning direction so as to correspond to the plurality of light emitting units, and receives light deflected by the deflector and reflected by an object.

17 Claims, 14 Drawing Sheets

(56) References Cited

U.S. PATENT DOCUMENTS

2014/0350836 A1* 11/2014 Stettner ................ G01S 17/023
  701/301
2015/0316650 A1   11/2015 Imai
2015/0331108 A1   11/2015 Itami et al.
2016/0061955 A1    3/2016 Imai et al.
2016/0261090 A1    9/2016 Sakai et al.

FOREIGN PATENT DOCUMENTS

| JP | 2011-128112   | 6/2011 |
| JP | 2012-107984   | 6/2012 |
| JP | 2014-020889   | 2/2014 |
| JP | 2016-48211 A  | 4/2016 |
| JP | 2016-161533 A | 9/2016 |
| JP | 2017-032552 A | 2/2017 |

* cited by examiner

FIG.2
(A)
LIGHT PROJECTING OPTICAL SYSTEM, SYNCHRONIZATION SYSTEM
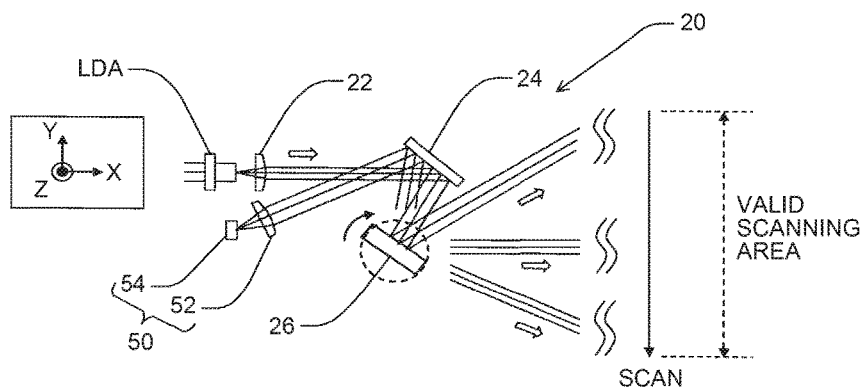
(B)
LIGHT RECEIVING OPTICAL SYSTEM
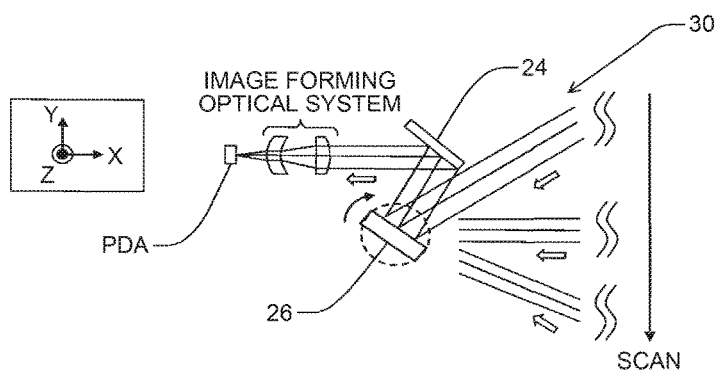
(C)
LIGHT PROJECTING OPTICAL SYSTEM, LIGHT RECEIVING OPTICAL SYSTEM (PARTIALLY OMITTED)
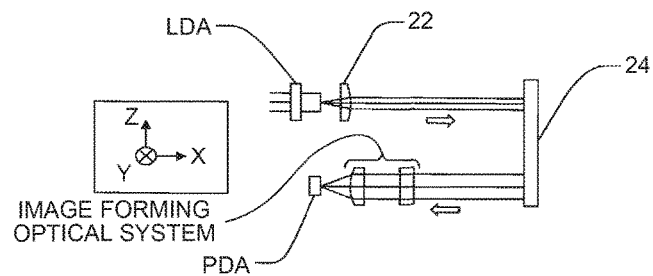

PD OUTPUT DETECTING UNIT

FIG.4
(A)
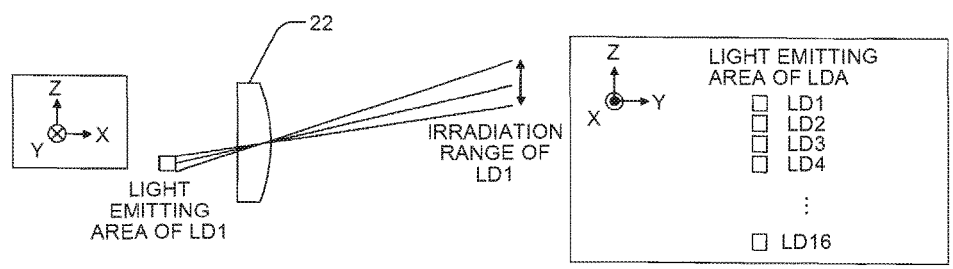
PART OF LIGHT PROJECTING OPTICAL SYSTEM
(B)
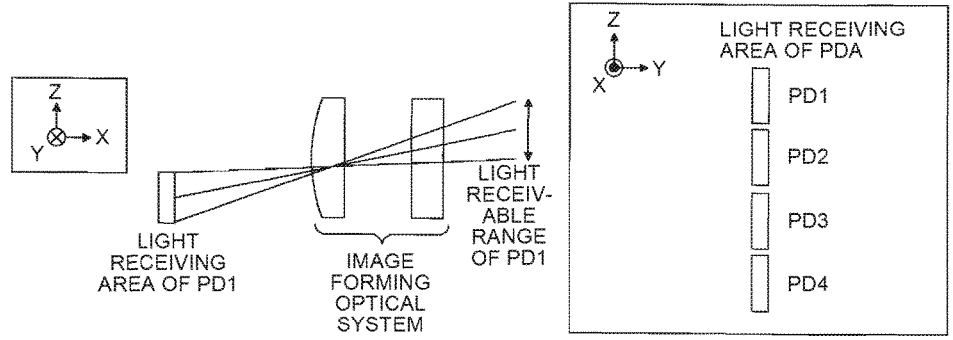
PART OF LIGHT RECEIVING OPTICAL SYSTEM

SCHEMATIC DIAGRAM OF RESOLUTION

ONE EMBODIMENT

FIRST MODIFICATION

SECOND MODIFICATION

FOURTH MODIFICATION

OBJECT DETECTING DEVICE, SENSING DEVICE, AND MOBILE OBJECT DEVICE

CROSS-REFERENCE TO RELATED APPLICATIONS

The present application claims priority to and incorporates by reference the entire contents of Japanese Patent Application No. 2015-055314 filed in Japan on Mar. 18, 2015.

BACKGROUND OF THE INVENTION

1. Field of the Invention

The present invention relates to an object detecting device, a sensing device, and a mobile object device, and more specifically relates to the object detecting device which detects whether there is an object and detects a distance and the like to the object, the sensing device provided with the object detecting device, and the mobile object device provided with the object detecting device or the sensing device.

2. Description of the Related Art

Recently, an optical scanning device which detects whether there is an object and detects a distance and the like to the object is actively developed (for example, refer to Japanese Laid-open Patent Publication No. 2011-128112, Japanese Laid-open Patent Publication No. 2009-063339, Japanese Laid-open Patent Publication No. 2012-107984, and Japanese Laid-open Patent Publication No. 2009-069003).

However, in a conventional optical scanning device, it is difficult to improve resolution in a detection range in a sub-scanning direction while inhibiting the increase of detection data obtaining time and the decrease of a detection distance.

SUMMARY OF THE INVENTION

It is an object of the present invention to at least partially solve the problems in the conventional technology.

An object detecting device includes: a light source which includes a plurality of light emitting units arranged in a sub-scanning direction; a deflector which deflects light from the light source; and an optical detector which includes a plurality of light receiving units arranged in the sub-scanning direction so as to correspond to the plurality of light emitting units, and receives light deflected by the deflector and reflected by an object.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a view for illustrating a light projecting optical system and a synchronization system at (A), illustrating a light receiving optical system at (B), and schematically illustrating an optical path of light from an LDA to a reflecting mirror and the optical path of the light from the reflecting mirror to a PDA at (C);

FIG. 4 is a view illustrating an LD1 (one light emitting area) of the LDA and an irradiation range of the LD1 at (A) and illustrating a PD1 (one light receiving area) of the PDA and a light receivable range of the PD1 at (B);

DETAILED DESCRIPTION OF THE PREFERRED EMBODIMENTS

A laser radar 100 as a scanning object detecting device of one embodiment of the present invention is hereinafter described with reference to FIGS. 1 to 9.

Figure 1:
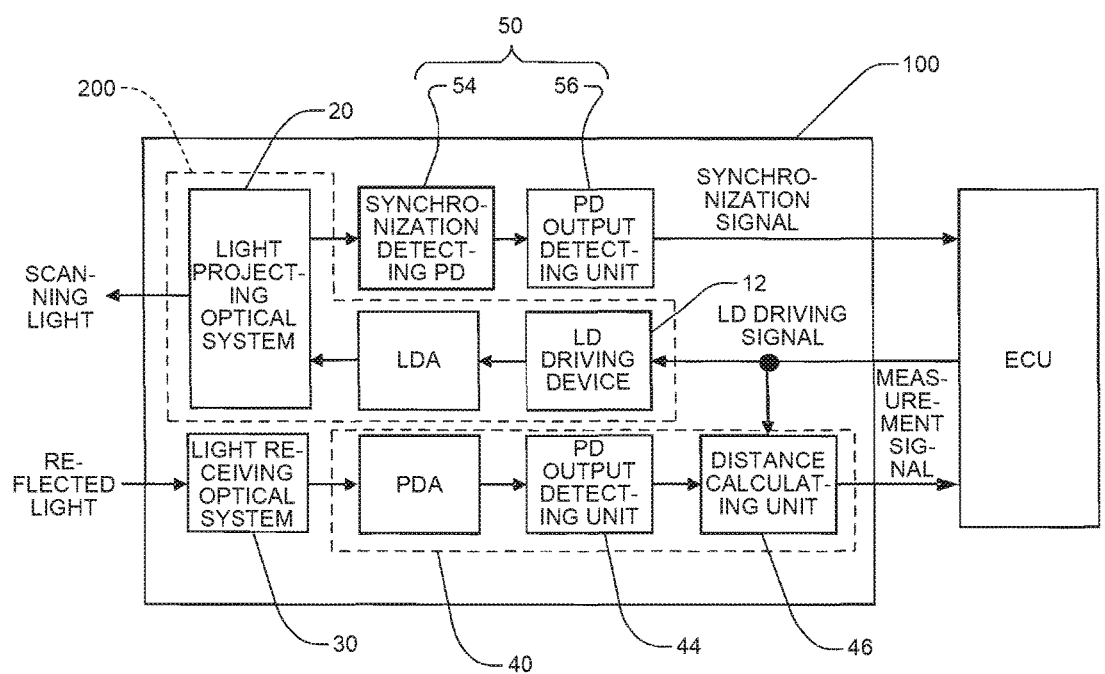
FIG. 1 is a view illustrating a schematic configuration of a laser radar of one embodiment.

FIG. 1 is a block diagram of a schematic configuration of the laser radar 100.

The laser radar 100 is a scanning laser radar mounted on an automobile as a mobile object for detecting whether there is an object (for example, a preceding vehicle, a stopping vehicle, an obstacle, a pedestrian and the like) by emitting light and detecting a distance to the object and the like by receiving reflected light (scattered light) from the object, as an example. The laser radar 100 is supplied with electricity from a battery (storage battery) of the automobile, for example. The automobile on which the laser radar 100 is mounted is hereinafter also referred to as a "mobile object device".

The laser radar 100 is provided with an LDA (laser diode array) including a plurality of LDs (laser diodes) as a light source, an LD driving device 12, a light projecting optical system 20, a light receiving optical system 30, a detection system 40, a synchronization system 50 and the like as illustrated in FIG. 1.

Each LD of the LDA is driven by the LD driving device 12 to emit laser light. The LD driving device 12 turns the LD on (allows the same to emit light) when an LD driving signal (rectangular pulse signal) is input from an ECU (engine control unit) of the automobile. The LDA is described later in detail.

FIG. 2 schematically illustrates the light projecting optical system 20 and the synchronization system 50 at (A). FIG. 2 schematically illustrates the light receiving optical system 30 at (B). It is hereinafter described with appropriate reference to an XYZ three-dimensional orthogonal coordinate system in which a Z-axis direction is a vertical direction illustrated at (A) in FIG. 2 and the like.

The light projecting optical system 20 includes a coupling lens 22 arranged on an optical path of the light from the LDA, a reflecting mirror 24 arranged on the optical path of the light through the coupling lens 22, and a rotary mirror 26 as a deflector arranged on the optical path of the light reflected by the reflecting mirror 24 as illustrated at (A) in FIG. 2. Herein, the reflecting mirror 24 is provided on the optical path between the coupling lens 22 and the rotary mirror 26 to turn the optical path in order to obtain a compact device.

Therefore, the light emitted from the LDA is shaped into the light having a predetermined beam profile by the coupling lens 26, and then reflected by the reflecting mirror 24 to be deflected about a Z-axis by the rotary mirror 26.

The light deflected in a predetermined deflection range about the Z-axis by the rotary mirror 26 is the light projected from the light projecting optical system 20, that is to say, the light emitted from the laser radar 100.

The rotary mirror 26 including a reflecting surface reflects (deflects) the light from the reflecting mirror 24 while rotating about a rotary axis (Z-axis), thereby scanning a valid scanning area corresponding to the above-described deflection range in a main-scanning direction being a horizontal uniaxial direction (herein, Y-axis direction) by the light. Although the rotary mirror 26 includes two reflecting surfaces (two opposing surfaces) as is understood from (A) in FIG. 2, there is no limitation and one or three or more mirrors may be included. It is also possible to provide at least two reflecting surfaces and arrange them so as to be inclined at different angles with respect to the rotary axis of the rotary mirror, thereby changing the area to be scanned/detected in the Z-axis direction.

That is to say, an optical scanning device 200 including the LDA, the LD driving device 12, and the light projecting optical system 20 to optically scan the valid scanning area in the main-scanning direction is configured (refer to FIG. 1). A direction (herein, Z-axis direction) orthogonal to the main-scanning direction (herein, Y-axis direction) is referred to as a "sub-scanning direction".

The light receiving optical system 30 includes the rotary mirror 26 which reflects the light projected from the light projecting optical system 20 to be reflected (scattered) by the object located in the valid scanning area, the reflecting mirror 24 which reflects the light from the rotary mirror 26, and an image forming optical system arranged on the optical path of the light from the reflecting mirror 24 to form an image of the light on a PDA (photo diode array) as an optical detector to be described later as illustrated at (B) in FIG. 2.

At (C) in FIG. 2, the optical path from the LDA to the reflecting mirror 24 and the optical path from the reflecting mirror 24 to the PDA are illustrated in a partially omitted manner.

As is understood from (C) in FIG. 2, the light projecting optical system 20 and the light receiving optical system 30 are arranged so as to be overlapped in the Z-axis direction and the rotary mirror 26 and the reflecting mirror 24 are shared by the light projecting optical system 20 and the light receiving optical system 30. According to this, it is possible to make relative positional displacement between an irradiation range of the LDA and a light receivable range of the PDA on the object small, thereby realizing stable object detection.

The detection system 40 includes the PDA which receives the light projected from the light projecting optical system 20 to be reflected (scattered) by the object located in the valid scanning area through the light receiving optical system 30, a PD output detecting unit 44 which detects a light reception signal of the PDA, and a distance calculating unit 46 which calculates the distance to the object from time difference between rise timing of the LD driving signal and detection timing of the light reception signal by the PD output detecting unit 44 as illustrated at (B) in FIG. 2 and in FIG. 1.

The light projected from the light projecting optical system 20 to be reflected (scattered) by the object is guided to the image forming optical system through the rotary mirror 26 and the reflecting mirror 24 to be concentrated on the PDA by the image forming optical system (refer to (B) in FIG. 2). At (B) in FIG. 2, the reflecting mirror 24 is provided between the rotary mirror 26 and the image forming optical system to turn the optical path in order to obtain the compact device. Although the image forming optical system is herein formed of two lenses, this may be formed of one lens or three or more lenses, or a mirror optical system may be used. The PDA is described later in detail.

The synchronization system 50 includes a synchronization lens 52 arranged on the optical path of the light emitted from the LDA to be reflected by the reflecting mirror 24 through the coupling lens 22, the light deflected by the rotary mirror 26 to be reflected again by the reflecting mirror 24, a synchronization detecting PD 54 arranged on the optical path of the light through the synchronization lens 52, and a PD output detecting unit 56 which detects an output signal of the synchronization detecting PD 54 as illustrated at (A) in FIG. 2 and in FIG. 1.

In detail, the reflecting mirror 24 is arranged on an upstream side of the above-described deflection range in a rotary direction of the rotary mirror 26 and the light deflected to the upstream side of the above-described deflection range by the rotary mirror 26 enters the same. Then, the light deflected by the rotary mirror 26 to be reflected by the reflecting mirror 24 enters the synchronization detecting PD 54 through the synchronization lens 52.

Meanwhile, the reflecting mirror 24 may also be arranged on a downstream side of the above-described deflection range in the rotary direction of the rotary mirror 26. The synchronization system 50 may also be arranged on the optical path of the light deflected by the rotary mirror 26 to be reflected by the reflecting mirror 24.

The signal is output from the synchronization detecting PD 54 each time the light reflected by each reflecting surface of the rotary mirror 26 is received by the synchronization detecting PD 54 by the rotation of the rotary mirror 26. That is to say, the signal is periodically output from the synchronization detecting PD 54.

By performing synchronous lighting for irradiating the synchronization detecting PD 54 with the light from the rotary mirror 26 in this manner, it becomes possible to obtain rotation timing of the rotary mirror 26 based on light reception timing by the synchronization detecting PD 54.

Then, it is possible to optically scan the valid scanning area in the main-scanning direction by pulse lighting of the LDA after a lapse of predetermined time after the synchronous lighting of the LDA. That is to say, it is possible to optically scan the valid scanning area in the main-scanning direction by the pulse lighting of the LDA in periods before and after timing at which the synchronization detecting PD 54 is irradiated by the light.

Herein, it is possible to use an APD (avalanche photodiode), a SPAD (single photon avalanche diode) being a Geiger mode APD and the like in addition to the above-described PD (photo diode) as a light receiving element used for measuring time (measuring distance) and detecting synchronization. The APD and SPAD having a higher sensitivity than that of the PD are advantageous in detection accuracy and detection distance.

Figure 3:
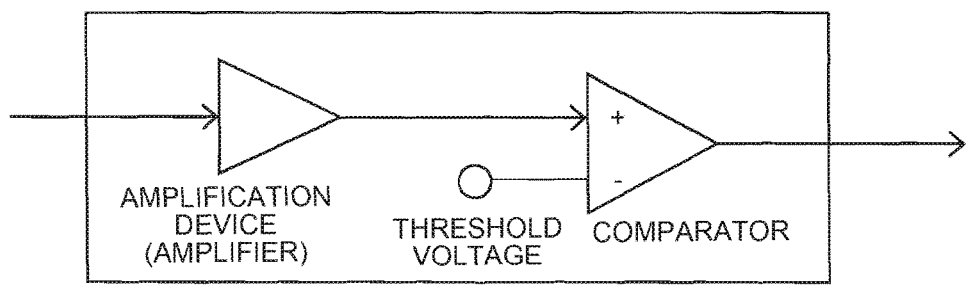
FIG. 3 is a view illustrating a configuration of a PD output detecting unit.

FIG. 3 illustrates an example of the PD output detecting unit in the detection system 40 and the synchronization system 50. As operation by the PD output detecting unit, there are two types which are signal amplification of the light reception signal and timing detection of the light reception signal. As for the signal amplification of the light reception signal, the light reception signal is amplified by using an amplification device such as an amplifier, and as for the timing detection of the light reception signal, a rising waveform part in which an output reaches a certain output (threshold level) or higher of the light reception signal from the PD is detected by using a comparison device such as a comparator. That is to say, the PD output detecting unit may obtain the light reception signal as a logic signal binarized by using the comparator.

When the PD output detecting unit 56 detects the light reception signal (rising waveform part) of the synchronization detecting PD 54, this outputs a synchronization signal to the ECU.

The ECU generates the LD driving signal based on the synchronization signal from the PD output detecting unit 56 and outputs the LD driving signal to the LD driving device 12 and the distance calculating unit 46.

When the PD output detecting unit 44 detects the light reception signal (rising waveform part) of the PD of the PDA, this outputs a detection signal (rectangular pulse signal) to the distance calculating unit 46.

The distance calculating unit 46 estimates time difference between the rise timing of the LD driving signal from the ECU and the rise timing of the detection signal from the PD output detecting unit 44 to be a reciprocating distance to the object, calculates the distance to the object by converting the time difference to the distance, and outputs a calculation result to the ECU as a measurement signal.

The ECU performs speed control and the like of the automobile, for example, based on the measurement signal from the distance calculating unit 46. The speed control of the automobile includes automatic brake (autobrake), for example.

Herein, the LD driving signal output from the ECU to the LD driving device 12 is formed of a bias light emission control signal formed of a single driving pulse for performing the synchronous lighting and a pulse light emission control signal formed of a plurality of driving pulses for performing the pulse lighting delayed from the bias light emission control signal. The bias light emission control signal and the pulse light emission control signal are generated based on the synchronization signal by the ECU.

The bias light emission control signal is input to the LD driving device 12 while the rotation timing of the rotary mirror 26 coincides with timing at which the light enters the synchronization detecting PD 54.

The pulse light emission control signal is input to the LD driving device 12 while the rotation timing of the rotary mirror 26 is between scan start timing and scan finish timing of the valid scanning area.

The LD driving device 12 performs the synchronous lighting (bias lighting) of the LD when the bias light emission control signal is input thereto. At that time, the light emitted from the LD follows a pathway through the coupling lens 22, the reflecting mirror 24, the rotary mirror 26, the reflecting mirror 24, and the synchronization lens 52 to be concentrated on the synchronization detecting PD 54.

The LD driving device 12 performs the pulse lighting (pulse light emission) of the LD when the pulse light emission control signal is input thereto. At that time, the light emitted from the LD follows the pathway through the coupling lens 22, the reflecting mirror 24, and the rotary mirror 26 to be projected toward the valid scanning area.

FIG. 4 illustrates a light emitting area of each LD of the LDA and the irradiation range of the light emitted from an LD1 being one LD of the LDA through the light projecting optical system 20 at (A). The LDA is a vertically stacked laser array in which a plurality of (for example, 16) LDs of LD1 to LD16 is arranged in the Z-axis direction (sub-scanning direction) as is understood from (A) in FIG. 4. Herein, the LD1 to LD16 are arranged in ascending order in a negative Z direction.

FIG. 4 illustrates a light receiving area of each PD of the PDA and the light receivable range of the reflected light from the object of a PD1 being one PD of the PDA at (B). The PDA is a vertically stacked photo diode array in which a plurality of (for example, four) PDs of PD1 to PD4 is arranged in the Z-axis direction (sub-scanning direction) as is understood from (B) in FIG. 4. Herein, the PD1 to PD4 are arranged in ascending order in the negative Z direction.

Figure 5:
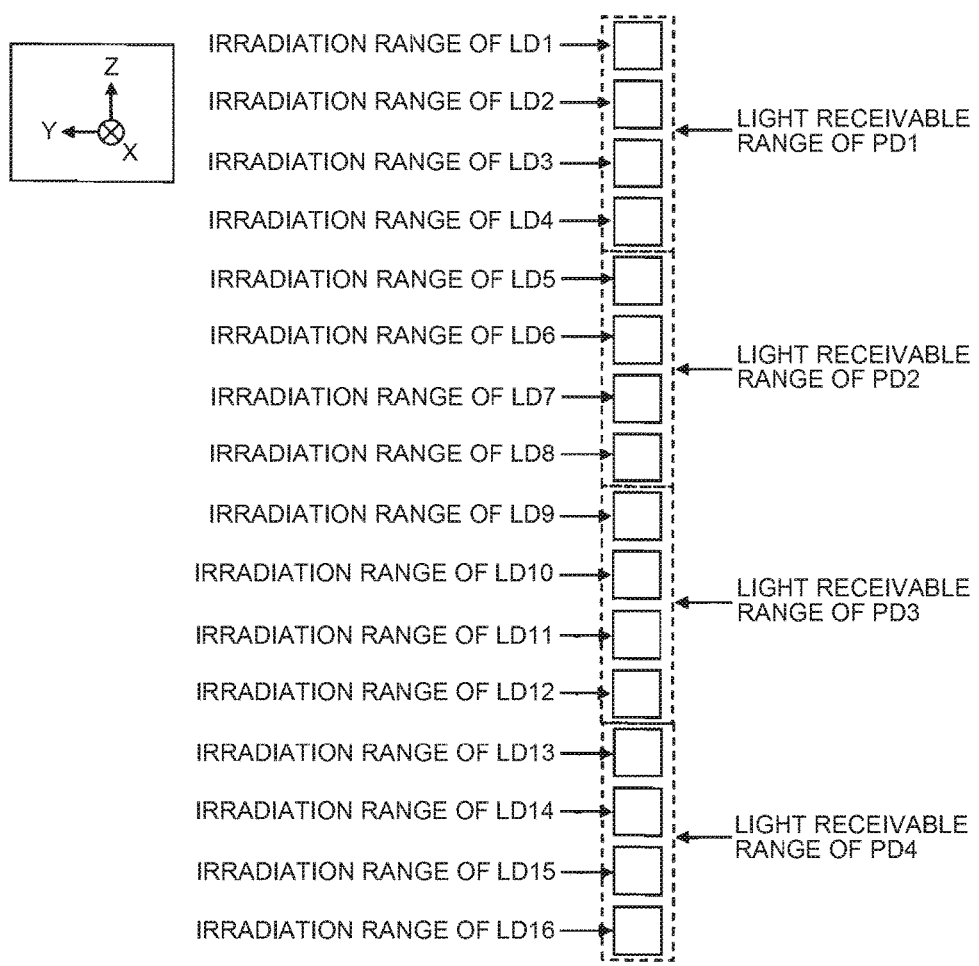
FIG. 5 is a view illustrating relationship between the irradiation range of each LD of the LDA and the light receivable range of each PD of the PDA.

FIG. 5 illustrates relationship between the irradiation range of each LD of the LDA and the light receivable range of each PD of the PDA.

The irradiation ranges of the LD1 to LD4 correspond to the light receivable range of the PD1, the irradiation ranges of the LD5 to LD8 correspond to the light receivable range of the PD2, the irradiation ranges of the LD9 to LD12 correspond to the light receivable range of the PD3, and the irradiation ranges of the LD13 to LD16 correspond to the light receivable range of the PD4.

That is to say, the light from the LD1 to LD4 is received by the PD1, the light from the LD5 to LD8 is received by the PD2, the light from the LD9 to LD12 is received by the PD3, and the light from the LD13 to LD16 is received by the PD4.

The light receivable range of each PD is set to be slightly larger than the corresponding irradiation ranges of the four LDs. According to this, it is possible to efficiently irradiate the light receivable range, so that a light quantity in the light receivable range may be increased and the detection accuracy and the detection distance may be improved. It is possible to inhibit deterioration in detection accuracy and detection distance even when the irradiation range and the light receivable range are slightly displaced with each other within a manufacturing error range.

Figure 6:
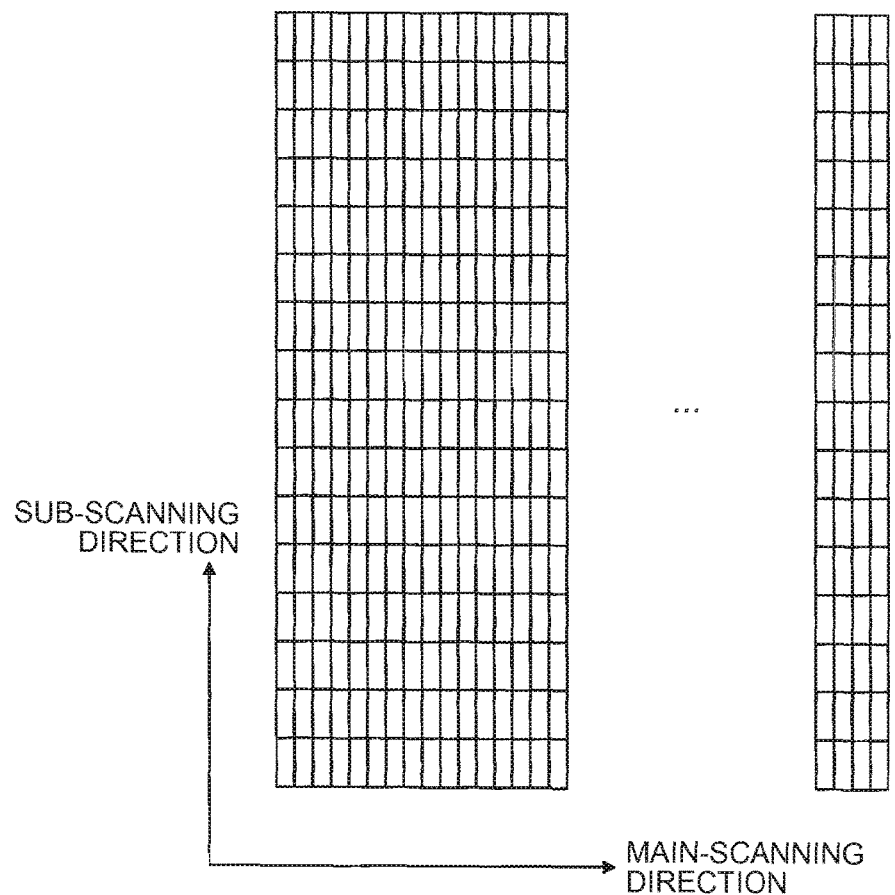
FIG. 6 is a schematic diagram of resolution.

FIG. 6 is a schematic diagram illustrating resolution of a detection range. A minimum square in FIG. 6 represents a range which may be measured by one measurement (resolution). An emission time interval of the laser light may be made shorter to realize improvement in resolution in the main-scanning direction (Y-axis direction). The number of LDs or the number of PDs may be increased to realize improvement in resolution in the sub-scanning direction (Z-axis direction) orthogonal to the main-scanning direction. Meanwhile, in FIG. 6, the resolution in the sub-scanning direction is 16.

Figure 7:
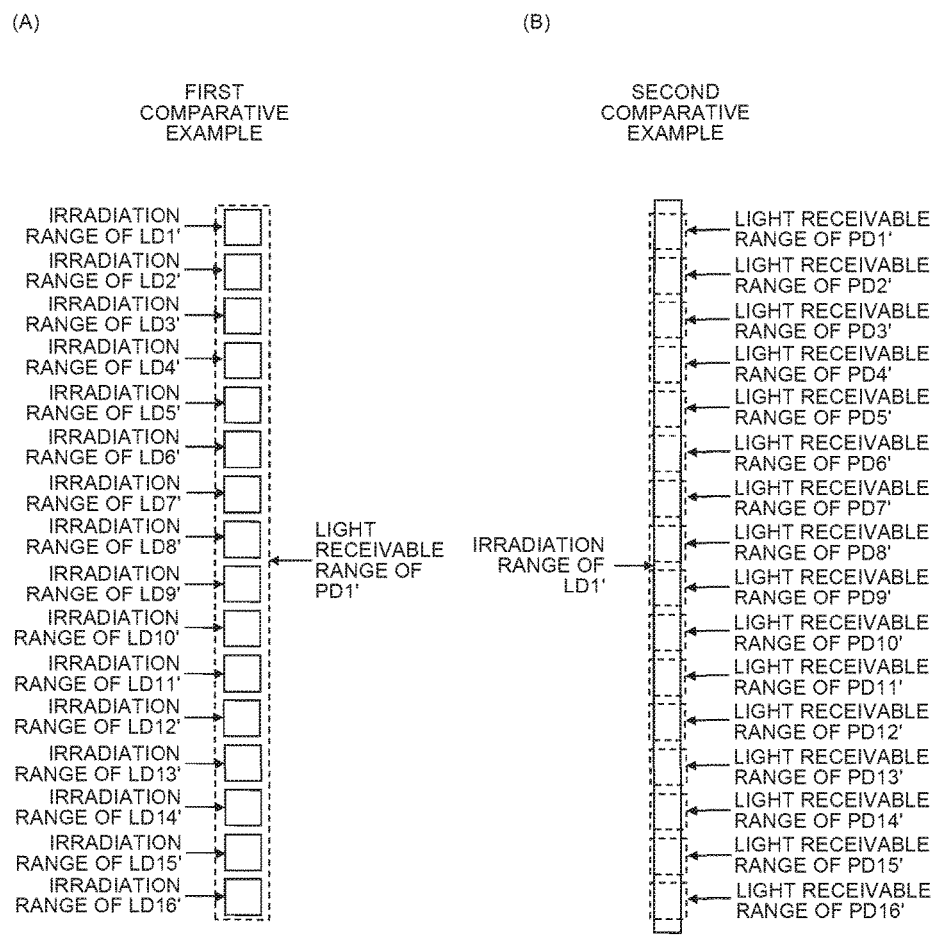
FIG. 7 is a view illustrating relationship between an irradiation range of each LD of an LDA and a light receivable range of each PD of a PDA in first and second comparative examples.

Herein, a laser radar in a first comparative example illustrated at (A) in FIG. 7 includes an LDA including 16 LDs (LD1' to LD16') which are one-dimensionally arranged in a sub-scanning direction and one PD (PD1') corresponding to the 16 LDs. That is to say, irradiation areas of 16 LDs correspond to a light receivable range of one PD.

In the first comparative example, since there is one PD, it is required to switch 16 LDs in a time-division manner to obtain data, so that it takes time to obtain the data. That is to say, it is required to turn the LD on 16 times in a time-division manner in order to obtain the data of one column at (A) in FIG. 7, so that detection data obtaining time is forced to be longer.

A laser radar in a second comparative example illustrated at (B) in FIG. 7 includes one LD (LD1') and a PDA including 16 PDs (PD1' to PD16') which are one-dimensionally arranged in a direction corresponding to a sub-scanning direction corresponding to the one LD.

Since the second comparative example is configured such that one LD covers 16 PDs, if a light quantity per one LD is equal to that of the first comparative example, the light quantity per one PD is small (1/16 of that of the first comparative example), so that a detection distance is forced to be shorter.

Therefore, in this embodiment, both the LDs and PDs are made arrays as described above.

Figure 8:
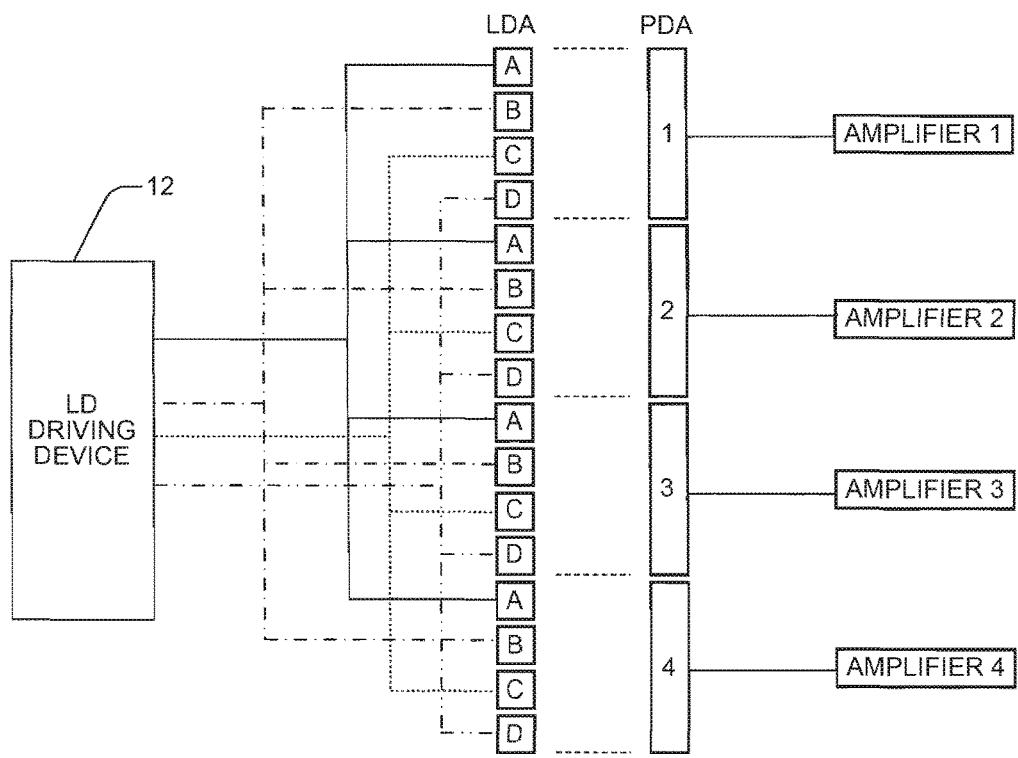
FIG. 8 is a view illustrating correspondence relationship among each LD of the LDA, each PD of the PDA, and four amplifiers of one embodiment.

In the laser radar 100 of this embodiment, four LDs represented by A in the LDA (they are also collectively referred to as LD group A) are electrically connected to one another (connected by wiring, for example) to be simultaneously turned on as illustrated in FIG. 8. Four LDs represented by B in the LDA (they are also collectively referred to as LD group B) are electrically connected to one another to be simultaneously turned on. Four LDs represented by C in the LDA (they are also collectively referred to as LD group C) are electrically connected to one another to be simultaneously turned on. Four LDs represented by D in the LDA (they are also collectively referred to as LD group D) are electrically connected to one another to be simultaneously turned on.

The LD on a positive Z side the most of the LD group A is the above-described LD1, the LD on the positive Z side the most of the LD group B is the above-described LD2, the LD on the positive Z side the most of the LD group C is the above-described LD3, and the LD on the positive Z side the most of the LD group D is the above-described LD4.

The LD on the positive Z side the second most of the LD group A is the above-described LD5, the LD on the positive Z side the second most of the LD group B is the above-described LD6, the LD on the positive Z side the second most of the LD group C is the above-described LD7, and the LD on the positive Z side the second most of the LD group D is the above-described LD8.

The LD on the positive Z side the third most of the LD group A is the above-described LD9, the LD on the positive Z side the third most of the LD group B is the above-described LD10, the LD on the positive Z side the third most of the LD group C is the above-described LD11, and the LD on the positive Z side the third most of the LD group D is the above-described LD12.

The LD on the positive Z side the fourth most of the LD group A is the above-described LD13, the LD on the positive Z side the fourth most of the LD group B is the above-described LD14, the LD on the positive Z side the fourth most of the LD group C is the above-described LD15, and the LD on the positive Z side the fourth most of the LD group D is the above-described LD16. In FIG. 8, four PDs represented by 1 to 4 in the PDA are the PD1 to PD4, respectively.

The, the four LDs of the LD1 to LD4 of the LD group A are simultaneously turned on and the reflected light is detected by the corresponding PD1 to PD4, respectively. Next, the four LDs of the LD5 to LD8 of the LD group B are simultaneously turned on and the reflected light is detected by the corresponding PD1 to PD4. Next, the four LDs of the LD9 to LD12 of the LD group C are simultaneously turned on and the reflected light is detected by the corresponding PD1 to PD4. Next, the four LDs of the LD13 to LD16 of the LD group D are simultaneously turned on and the reflected light is detected by the corresponding PD1 to PD4. Meanwhile, the PD1 to PD4 are independently connected to amplifiers 1 to 4, respectively. The amplifiers 1 to 4 are connected to the PD output detecting unit 44. Then, an output signal of each PD is amplified by the corresponding amplifier to be transmitted to the PD output detecting unit 44.

As a result, distance data corresponding to one column in the sub-scanning direction in FIG. 6 may be obtained. In this manner, it is possible to make the number of switching times smaller than that when the LD to be turned on is temporally switched (lighting timing is made different for each LD) by making both the LDs and PDs the arrays and configuring to turn on each part (LD group formed of a plurality of LDs) of the LDA being an array-shaped light source to temporally switch the LD group to be turned on (lighting timing is made different for each LD group), and as a result, the distance data of high resolution in the sub-scanning direction may be obtained at high speed.

Herein, it is possible to obtain the distance data of 16 resolution in the sub-scanning direction by switching four times for 16 LDs and four PDs.

When scanning and detecting by the laser radar 100, by performing such lighting operation in the sub-scanning direction in each scanning position in the main-scanning direction (position corresponding to each driving pulse of the pulse light emission control signal), it is possible to obtain the distance data of high resolution in the sub-scanning direction at high speed in the scanning position.

As a result, it is possible to obtain the distance data of high resolution in the main-scanning direction and sub-scanning direction as illustrated in FIG. 6 (herein, distance data of higher resolution in the sub-scanning direction).

It is preferable to electrically connect the LDs not adjacent to each other when electrically connecting a plurality of LDs to each other and simultaneously turning them on as illustrated in FIG. 8. According to this, it is possible to inhibit local heat generation to avoid an adverse effect due to heat generation such as deterioration in light emission quantity of the LD.

A plurality of electrically connected LDs preferably individually corresponds to a plurality of different PDs. That is to say, as illustrated in FIG. 8, when a plurality of LDs is electrically connected to each other, it is preferable to electrically connect the LDs corresponding to the different PDs to each other, and by doing so, it is possible to substantially simultaneously obtain the distance data in a plurality of different positions in the sub-scanning direction by simultaneous light emission (simultaneous lighting) of one time, thereby more efficiently obtaining the data and also effectively utilizing the light to increase the detection distance.

Figure 9:
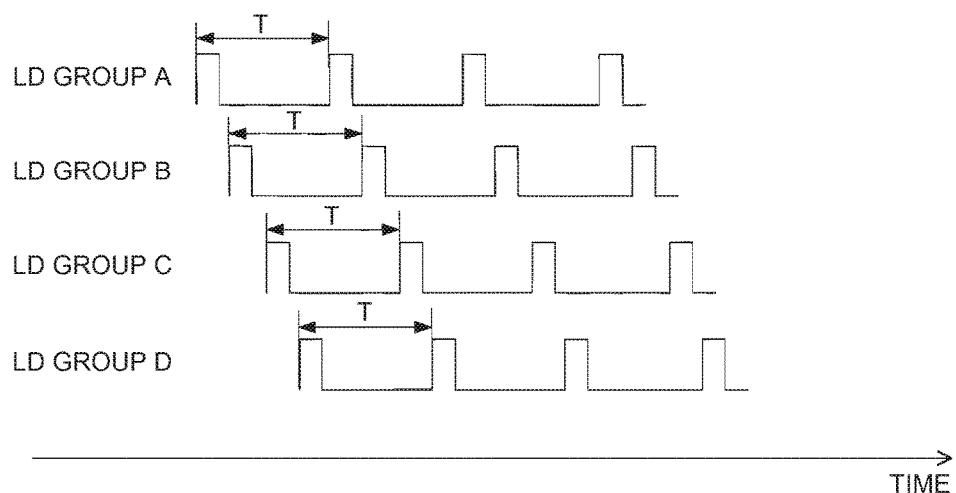
FIG. 9 is a timing chart illustrating light emission timing of each LD group in the LDA.

As in a timing chart illustrated in FIG. 9, each LD group of the four LD groups A to D is turned on periodically (herein, with the same lighting period T) at different timings among the LD groups, and switching time of the LD group to be turned on, that is to say, time after the lighting of one LD group finishes until the lighting of the next LD group starts is set to be shorter than the lighting period T. According to this, it is possible to make the lighting period T of each LD group longer and inhibit the heat generation and the deterioration in light emission quantity of each LD of the LD group, and in addition, it is possible to make a lifetime of the LD longer.

The laser radar 100 of this embodiment described above is provided with the LDA (light source) including a plurality of LDs (light emitting units) arranged in the Z-axis direction (direction corresponding to the sub-scanning direction), the rotary mirror 26 (deflector) which deflects the light from the LDA, and the PDA (optical detector) including a plurality of PDs (light receiving units) arranged in the direction corresponding to the sub-scanning direction so as to correspond to a plurality of LDs to receive the light deflected by the rotary mirror 26 to be reflected by the object.

In this case, since a plurality of LDs corresponds to a plurality of PDs with respect to the sub-scanning direction, it is possible to obtain the detection data (distance data) of high resolution in the sub-scanning direction at high speed while inhibiting deterioration in light reception quantity by each PD.

As a result, it is possible to improve resolution in the detection range in the sub-scanning direction while inhibiting the increase of the detection data obtaining time and the decrease of the detection distance.

Since the number of LDs is different from that of PDs, positioning of the LD and the PD corresponding to each other is easier than that when the LD and the PD one-to-one correspond to each other.

A plurality of LDs includes a plurality of (for example, four) LD groups (light emitting unit groups) formed of at least two (for example, four) LDs which are electrically connected to each other.

In this case, it is possible to simultaneously turn on at least two LDs of each LD group, so that the number of lighting switching times may be decreased and the detection data obtaining time may be shortened.

Since at least two (for example, four) LDs which are electrically connected to each other are not adjacent to each other, thermal and electrical crosstalk may be reduced.

Since at least two (for example, four) LDs which are electrically connected to each other correspond to different PDs, the detection data may be efficiently obtained.

Since at least two (for example, four) LDs which are electrically connected to each other are simultaneously turned on and the lighting timing differs among the LD groups, the detection data may be further efficiently obtained.

Since each LD group is turned on with the lighting period T (predetermined period) and the time after the lighting of one LD group out of a plurality of LD groups finishes until the lighting of the next LD group starts is shorter than the lighting period T, the detection data obtaining time may be shortened in total. It is possible to set the lighting period T of each LD group to be longer, so that it is possible to inhibit the heat generation of the LD of the LD group and inhibit the deterioration in light emission quantity by the heat generation of the LD.

The mobile object device is provided with the laser radar 100 and the automobile (mobile object) on which the laser radar 100 is mounted, so that this is excellent in safety.

Figure 10:
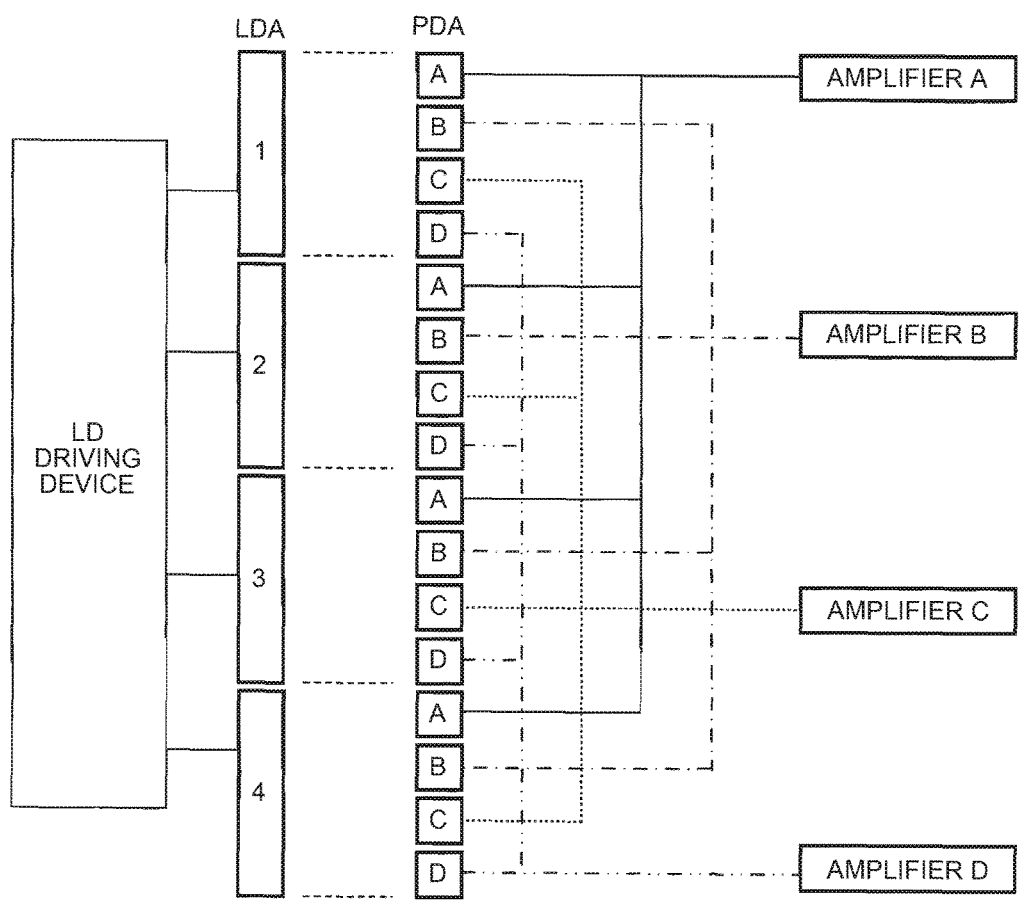
FIG. 10 is a view illustrating correspondence relationship among each LD of an LDA, each PD of a PDA, and four amplifiers of a first modification.

Meanwhile, in a first modification illustrated in FIG. 10, both LDs and PDs are made arrays and the number of PDs is made larger than that of LDs.

An LDA in the first modification is a vertically stacked laser array in which a plurality of (for example, four) LDs of LD1 to LD4 is stacked in a Z-axis direction (vertical direction). Herein, the LD1 to LD4 are arranged in ascending order in a negative Z direction.

A PDA in the first modification is a vertically stacked photo diode array in which a plurality of (for example, 16) PDs of PD1 to PD16 is stacked in the Z-axis direction (vertical direction). Herein, the PD1 to PD16 are arranged in ascending order in the negative Z direction. Meanwhile, the LDs represented by 1 to 4 in the LDA are the LD1 to LD4, respectively, in FIG. 10.

An irradiation range of the LD1 corresponds to light receivable ranges of the PD1 to PD4, the irradiation range of the LD2 corresponds to the light receivable ranges of the PD5 to PD8, the irradiation range of the LD3 corresponds to the light receivable ranges of the PD9 to PD12, and the irradiation range of the LD4 corresponds to the light receivable ranges of the PD13 to PD16.

That is to say, light from the LD1 is received by the PD1 to PD4, the light from the LD2 is received by the PD5 to PD8, the light from the LD3 is received by the PD9 to PD12, and the light from the LD4 is received by the PD13 to PD16.

The irradiation range of each LD is set to be slightly larger than corresponding light receiving ranges of the four PDs. According to this, it is possible to efficiently irradiate the light receivable range, so that a light reception quantity in the light receivable range may be increased and detection accuracy and a detection distance may be improved. It is possible to inhibit deterioration in detection accuracy and detection distance even when the irradiation range and the light receivable range are slightly displaced with each other within a manufacturing error range.

In a laser radar 100 of the first modification, four PDs represented by A in the PDA (they are also collectively referred to as PD group A) are electrically connected to one another to be connected to an amplifier A as illustrated in FIG. 10. Four PDs represented by B (they are also collectively referred to as PD group B) are electrically connected to one another to be connected to an amplifier B. Four PDs represented by C (they are also collectively referred to as PD group C) are electrically connected to one another to be connected to an amplifier C. Four PDs represented by D (they are also collectively referred to as PD group D) are electrically connected to one another to be connected to an amplifier D.

The PD on a positive Z side the most of the PD group A is the above-described PD1, the PD on the positive Z side the most of the PD group B is the above-described PD2, the PD on the positive Z side the most of the PD group C is the above-described PD3, and the PD on the positive Z side the most of the PD group D is the above-described PD4.

The PD on the positive Z side the second most of the PD group A is the above-described PD5, the PD on the positive Z side the second most of the PD group B is the above-described PD6, the PD on the positive Z side the second most of the PD group C is the above-described PD7, and the PD on the positive Z side the second most of the PD group D is the above-described PD8.

The PD on the positive Z side the third most of the PD group A is the above-described PD9, the PD on the positive Z side the third most of the PD group B is the above-described PD10, the PD on the positive Z side the third most of the PD group C is the above-described PD11, and the PD on the positive Z side the third most of the PD group D is the above-described PD12.

The PD on the positive Z side the fourth most of the PD group A is the above-described PD13, the PD on the positive Z side the fourth most of the PD group B is the above-described PD14, the PD on the positive Z side the fourth most of the PD group C is the above-described PD15, and the PD on the positive Z side the fourth most of the PD group D is the above-described PD16.

Then, the LD1 is turned on and reflected light is detected by the corresponding PD1 to PD4. Next, the LD2 is turned on and the reflected light is detected by the corresponding PD5 to PD8. Next, the LD3 is turned on and the reflected light is detected by the corresponding PD9 to PD12. Next, the LD4 is turned on and the reflected light is detected by the corresponding PD13 to PD16. Meanwhile, the four PDs of PD1, PD5, PD9, and PD13 of the PD group A are connected to the amplifier A. The four PDs of PD2, PD6, PD10, and PD14 of the PD group B are connected to the amplifier B. The four PDs of PD3, PD7, PD11, and PD15 of the PD group C are connected to the amplifier C. Each amplifier is connected to a PD output detecting unit 44. Then, an output signal of each PD is amplified by the corresponding amplifier to be transmitted to the PD output detecting unit 44.

Meanwhile, although it is possible to provide one amplifier for each of a plurality of PDs, it is preferable to connect a plurality of PDs to one amplifier as described above. In this case, the number of amplifiers may be decreased. Furthermore, it is also possible to decrease the number of amplifiers also by configuring such that the PD connected to the amplifier is switched by a switch, however, the configuration in FIG. 10 does not require the switch, so that operational reliability thereof is higher and more preferable.

As a result, distance data corresponding to one column in the sub-scanning direction in FIG. 6 may be obtained. In this manner, in the first modification, it is possible to obtain the distance data of high resolution in the sub-scanning direction at high speed with a small number of switching times by making the number of PDs larger than that of LDs (herein, four times the same) to make both the LDs and PDs the arrays and temporally switching a small number of LDs to be turned on (lighting timing is made different among the LDs).

Herein, it is possible to obtain the distance data of 16 resolution in the sub-scanning direction by switching four times for four LDs and 16 PDs.

When scanning and detecting by the laser radar, by performing such lighting operation in the sub-scanning direction in each scanning position in a main-scanning direction (position corresponding to each driving pulse of a pulse light emission control signal), it is possible to obtain the distance data of high resolution in the sub-scanning direction at high speed in the scanning position.

As a result, it is possible to obtain the distance data of high resolution in the main-scanning direction and sub-scanning direction as illustrated in FIG. 6 (herein, distance data of higher resolution in the sub-scanning direction).

It is preferable to electrically connect the PDs not adjacent to each other also when electrically connecting a plurality of PDs to each other as illustrated in FIG. 10. In this case, it is possible to reduce thermal and electrical crosstalk.

A plurality of electrically connected PDs preferably individually corresponds to a plurality of different LDs. This case is efficient when one LD is turned on and it is detected by a plurality of different PDs. For example, the light from the LD1 may be used in light reception by any one of the PD1 to PD4 and it becomes possible to set the light which irradiates a part other than the PD1 to PD4 to be smaller, so that the light may be effectively utilized, and as a result, the detection distance may be made longer. A small number of amplifiers may be effectively utilized.

That is to say, as illustrated in FIG. 10, when a plurality of PDs is electrically connected to each other, it is preferable to electrically connect the PDs corresponding to the different LDs to each other, and by doing so, it is possible to substantially simultaneously obtain the distance data in a plurality of different positions in the sub-scanning direction by light emission of one time and the data may be efficiently obtained, and in addition, it is possible to effectively use the light to increase the detection distance.

Each of the four LDs of the LD1 to LD4 is turned on periodically (herein, with the same lighting period T) at different timings among the LDs, and switching time of the LD to be turned on, that is to say, time after the lighting of one LD finishes until the lighting of the next LD starts is set to be shorter than the lighting period. According to this, it is possible to make the lighting period of each LD longer and inhibit heat generation and deterioration in light emission quantity of the LD, and in addition, it is possible to make a lifetime of the LD longer.

In the laser radar of the first modification described above, a plurality of PDs includes a plurality of (for example, four) PD groups each formed of at least two (for example, four) PDs which are electrically connected to each other, so that the detection data may be efficiently obtained.

Since at least two (for example, four) PDs which are electrically connected to each other are not adjacent to each other, the thermal and electrical crosstalk may be reduced.

Since at least two (for example, four) PDs which are electrically connected to each other correspond to different PDs, the detection data may be further efficiently obtained.

Since the lighting timing of each LD is different, it is possible to efficiently obtain the detection data.

Each LD is turned on with the lighting period T (predetermined period) and the time after the lighting of one LD out of a plurality of LDs finishes until the lighting of the next LD starts is shorter than the lighting period T.

In this case, detection data obtaining time may be shortened in total. It is possible to set the lighting period T of each LD to be longer, inhibit the heat generation of the LD, and inhibit the deterioration in light emission quantity by the heat generation of the LD.

When the amplifier commonly connected to at least two (for example, four) PDs which are electrically connected to each other is further provided, the number of amplifiers may be decreased and a small size and a low cost may be realized.

When the amplifiers fewer than the PDs are further provided and at least two (for example, four) PDs out of a plurality of PDs are connected to the common amplifier at different timings also, it is possible to decrease the number of amplifiers to realize the small size and low cost.

Figure 11:
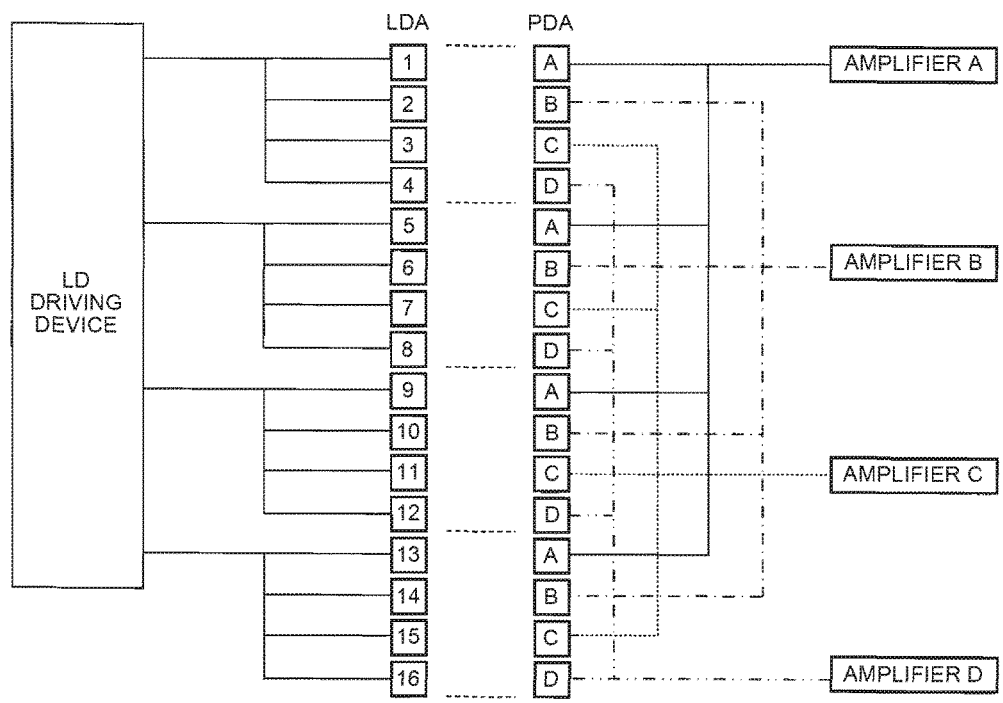
FIG. 11 is a view illustrating correspondence relationship among each LD of an LDA, each PD of a PDA, and four amplifiers of a second modification.

It is also possible to electrically connect LD1 to LD4 to one another to simultaneously turn on, electrically connect LD5 to LD8 to one another to simultaneously turn on, electrically connect LD9 to LD12 to one another to simultaneously turn on, and electrically connect LD13 to LD16 to one another to simultaneously turn on, as in a second modification illustrated in FIG. 11. When scanning and detecting, four LD groups each of which is formed of four LDs which are electrically connected to one another may be turned on at different timings. Herein, the number of LDs and that of PDs are the same and the LDs and PDs one-to-one correspond to each other. Meanwhile, in the second modification, connection relationship between each PD of a PDA and each amplifier is the same as that in the first modification illustrated in FIG. 10.

Figure 12:
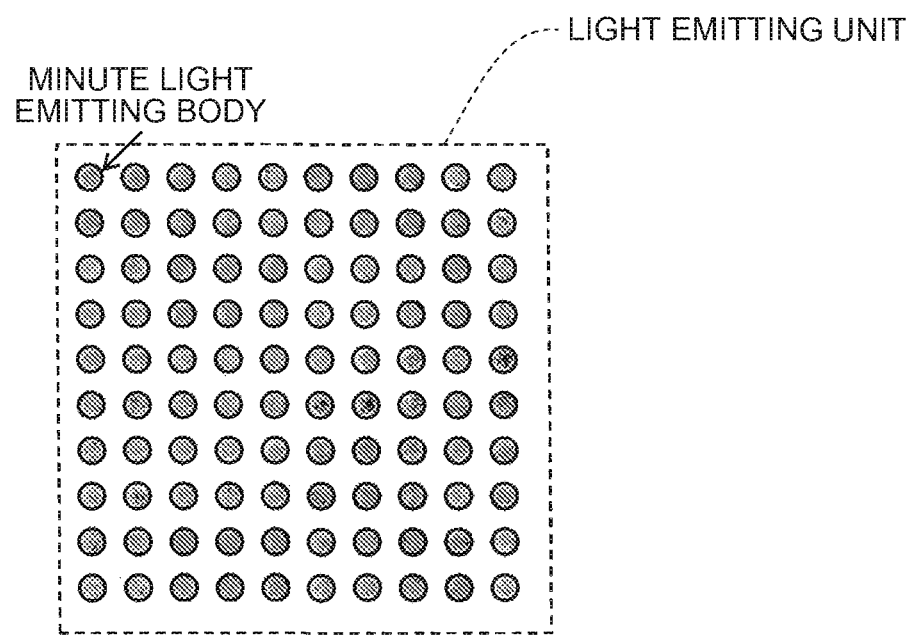
FIG. 12 is a view for illustrating a light emitting unit of a third modification.

It is also possible to use a light emitting unit including a large number of minute light emitting bodies arranged in an array pattern in place of each LD as in a third modification illustrated in FIG. 12. In this case, it is possible to increase the number of minute light emitting bodies to improve an output of the light emitting unit, so that the output may be easily increased and a detection distance may be made longer.

Figure 13:
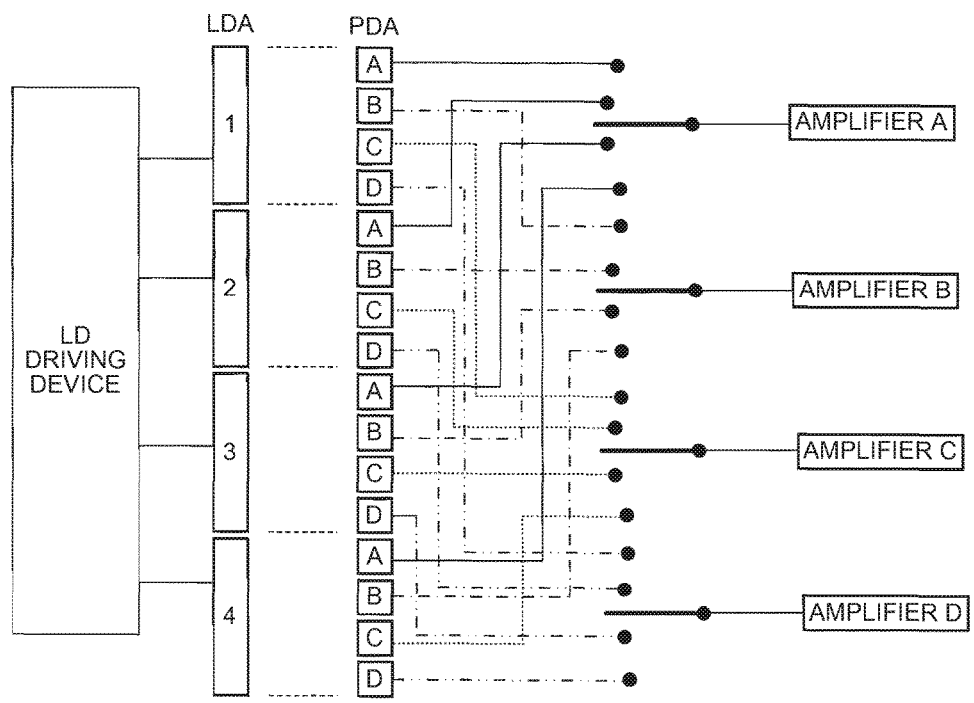
FIG. 13 is a view illustrating correspondence relationship among each LD of an LDA, each PD of a PDA, and four amplifiers of a fourth modification.
Figure 14:
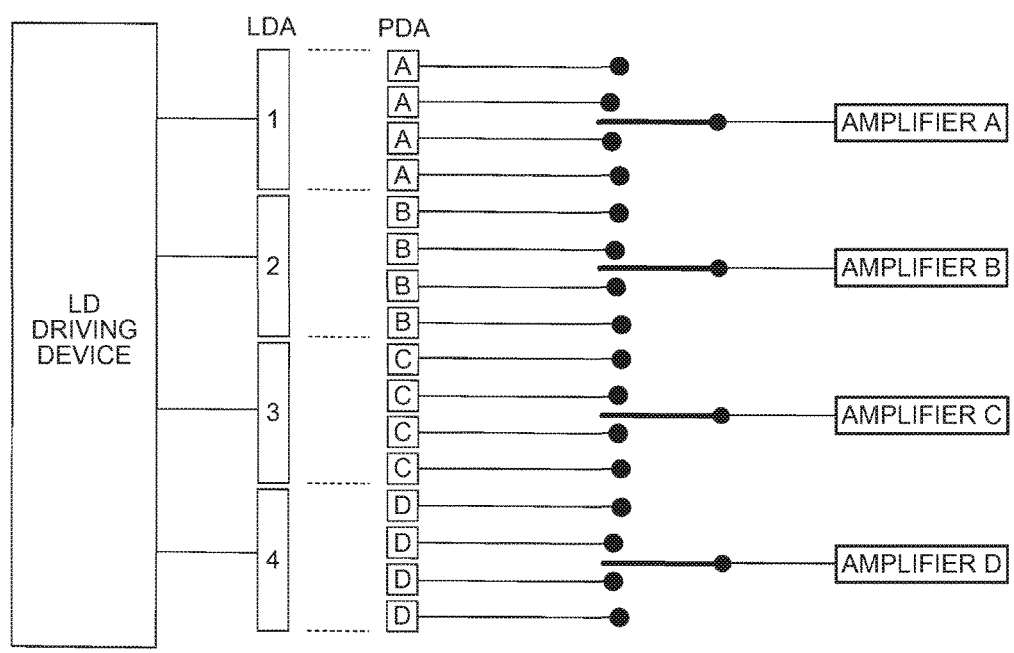
FIG. 14 is a view illustrating correspondence relationship among each LD of an LDA, each PD of a PDA, and four amplifiers of a fifth modification.

It is also possible to set the number of amplifiers smaller than the number of PDs and configure such that the amplifier connected to the PD is temporally switched by using a relay, for example, as in fourth and fifth modifications illustrated in FIGS. 13 and 14, respectively. According to this, the number of amplifiers may be decreased, and a compact and low-cost circuit may be realized.

In the fourth modification illustrated in FIG. 13, correspondence relationship between an LD of an LDA and the PD of a PDA is the same as that in the first modification illustrated in FIG. 10. In the fourth modification, four PDs (PD1, PD5, PD9, PD13) of a PD group A are selectively connected to an amplifier A, four PDs (PD2, PD6, PD10, PD14) of a PD group B are selectively connected to an amplifier B, four PDs (PD3, PD7, PD11, PD15) of a PD group C are selectively connected to an amplifier C, and four PDs (PD4, PD8, PD12, PD16) of a PD group D are selectively connected to an amplifier D. Herein, the four PDs of each PD group are not electrically connected to one another. When scanning and detecting, LD1 to LD4 are turned on at different timings; and when the LD1 is turned on, the amplifiers A to D may be connected to the PD1 to PD4, respectively, when the LD2 is turned on, the amplifiers A to D may be connected to the PD5 to PD8, respectively, when the LD3 is turned on, the amplifiers A to D may be connected to the PD9 to PD12, respectively, and when the LD4 is turned on, the amplifiers A to D may be connected to the PD13 to PD16, respectively.

In the fifth modification illustrated in FIG. 14, four PDs of PD1 to PD4 corresponding to an LD1 are collectively referred to as a PD group A, four PDs of PD5 to PD8 corresponding to an LD2 are collectively referred to as a PD group B, four PDs of PD9 to PD12 corresponding to an LD3 are collectively referred to as a PD group C, and four PDs of PD13 to PD16 corresponding to an LD4 are collectively referred to as a PD group D. Herein, the four PDs of each PD group are not electrically connected to one another. An amplifier A is selectively connected to the four PDs of the PD group A. An amplifier B is selectively connected to the four PDs of the PD group B. An amplifier C is selectively connected to the four PDs of the PD group C. An amplifier D is selectively connected to the four PDs of the PD group D. For example, first, the LD1 to LD4 are simultaneously turned on and the amplifiers A to D are connected to the PD1, PD5, PD9, and PD13, respectively, to scan and detect. Then, the LD1 to LD4 are simultaneously turned on and the amplifiers A to D are connected to the PD2, PD6, PD10, and PD14, respectively, to scan and detect. Then, the LD1 to LD4 are simultaneously turned on and the amplifiers A to D are connected to the PD3, PD7, PD11, and PD15, respectively, to scan and detect. Then, the LD1 to LD4 are simultaneously turned on and the amplifiers A to D are connected to the PD4, PD8, PD12, and PD16, respectively, to scan and detect. Meanwhile, it is also possible to make lighting timings of at least two of the LD1 to LD4 different from each other.

Figure 15:
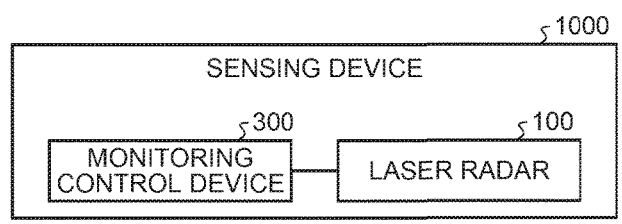
FIG. 15 is a view for illustrating a sensing device.

FIG. 15 illustrates a sensing device 1000 provided with the laser radar 100. The sensing device 1000 is mounted on the mobile object and is provided with a monitoring control device 300 electrically connected to the laser radar 100 in addition to the laser radar 100. The sensing device 1000 is attached in the vicinity of a bumper or a rearview mirror of the vehicle. The monitoring control device 300 estimates a shape and a size of the object, calculates positional information of the object, calculates moving information, and recognizes a type of the object based on a detection result of the laser radar 100, thereby determining whether there is danger. When the monitoring control device 300 determines that there is danger, this issues a warning such as an alarm to call mobile object operator's attention, issues an instruction to avoid danger by turning a steering wheel to a steering control unit of the mobile object, and issues an instruction for braking to the ECU of the mobile object. Meanwhile, the sensing device 1000 is supplied with electricity from the battery of the vehicle, for example.

Meanwhile, the monitoring control device 300 may be provided integrally with the laser radar 100 or may be provided separately from the laser radar 100. The monitoring control device 300 may perform at least a part of control performed by the ECU.

The sensing device 1000 described above is provided with the laser radar 100 and the monitoring control device 300 which obtains the moving information including at least one of presence of the object, a moving direction thereof, and a moving speed thereof, based on an output of the laser radar 100.

In this case, braking control and the like of the mobile object may be performed with a high degree of accuracy.

The sensing device 1000 is mounted on the mobile object and the monitoring control device 300 determines whether there is danger based on at least one of the positional information and the moving information of the object.

In this case, control to avoid danger of the mobile object may be performed with a high degree of accuracy.

The mobile object device provided with the sensing device 1000 and the mobile object on which the sensing device is mounted is excellent in safety.

Meanwhile, the configuration of the laser radar in the above-described embodiment and each modification may be appropriately changed.

For example, although the LDA in which a plurality of LDs is one-dimensionally arranged in the direction corresponding to the sub scanning is used as the light source in the above-described embodiment and each modification, there is no limitation. For example, the LDA in which a plurality of LDs is two-dimensionally arranged, a surface emission laser array in which a plurality of VCSELs (surface emission lasers) is one-dimensionally arranged in the sub-scanning direction, and a VCSEL array in which the VCSELs are two-dimensionally arranged may also be used.

Although the LD (end face emission laser) and the VCSEL (surface emission laser) may be used as a semiconductor laser used as the light source, it is possible to set the number of arrays to be larger with the VCSEL due to its high density integration.

At least two LDs out of a plurality of (for example, four) LDs which is electrically connected to each other may be adjacent to each other in the above-described embodiment. At least two LDs out of a plurality of (for example, four) PDs which is electrically connected to each other may be adjacent to each other in the above-described first and second modifications.

The light projecting optical system may include another lens in place of or in addition to the coupling lens.

It is also possible that the light projecting optical system and the light receiving optical system do not include the reflecting mirror. That is to say, it is also possible to allow the light from the LDA to enter the rotary mirror without turning the optical path and guide the light reflected by the object and deflected by the rotary mirror to the PDA without turning the optical path.

The light receiving optical system may include another optical element (for example, a condenser mirror) in place of or in addition to the lens.

It is also possible to use another mirror such as a polygon mirror (rotary polygon mirror), a galvanometer mirror, and an MEMS mirror, for example, in place of the rotary mirror as the deflector.

The synchronization system may include another optical element (for example, the condenser mirror) in place of the synchronization lens.

Although the automobile is described as an example of the mobile object on which the laser radar is mounted in the above-described embodiment and each modification, the mobile object may also be a vehicle other than the automobile, an aircraft, a ship and the like.

The specific number and shape used in the description above are illustrative only and they may be appropriately changed without departing from the gist of the present invention.

As is clear from the description above, the laser radar of the above-described embodiment and each modification is the technology in which a so-called time of flight (TOF) method of detecting whether there is the object and detecting the distance to the object is used and is widely used in the industrial field of motion capturing technology, a range finder and the like in addition to sensing in the mobile object. That is to say, the object detecting device of the present invention is not necessarily mounted on the mobile object.

A thinking process in which the inventor conceives of the above-described embodiment and each modification is hereinafter described.

A laser radar is conventionally known as an on-vehicle device which detects whether there is an object in front of a running vehicle and detects a distance to the object. Although various optical systems for laser radar are known, as disclosed in JP 2011-128112 A, JP 2009-063339 A, JP 2012-107984 A, and JP 2009-069003 A, it is possible to detect whether there is the object in a desired range and detect the distance to the object by scanning laser light emitted from a light source by a rotary mirror to detect light reflected or scattered by the object by an optical detector through the rotary mirror again. In this manner, a scanning laser radar which scans the object located in a scanning area (detection range) by the laser light and detects/scans the reflected light by the optical detector may concentrate the laser light only to a portion in which optical detection is required, so that this is advantageous in detection accuracy and detection distance, and this may also minimize an area detectable by the optical detector, so that this is also advantageous in terms of cost of the optical detector.

In such laser radar, it is possible to improve resolution by increasing laser emission timings in a main-scanning direction. On the other hand, it is possible to improve the resolution in a sub-scanning direction orthogonal to the main-scanning direction by increasing the number of layers (layer number) in the sub-scanning direction by increasing the number of lasers in a direction corresponding to the sub-scanning direction or increasing the number of light receiving elements of the optical detector.

The above-described layer number is desirably larger in order to correctly capture a shape of the object. Therefore, increasing the layer number is considered. It is possible to realize the layer number according to the number of lasers by increasing the number of lasers while setting the number of light receiving elements to one. However, since there is only one light receiving element, it is required to obtain distance information in each layer by shifting light emission timing of a plurality of lasers, so that it takes time to obtain data. This becomes remarkable as the layer number increases.

On the other hand, it is possible to realize the layer number according to the number of light receiving elements by increasing the number of light receiving elements while setting the number lasers to one. However, it is required to spread the laser to cover a plurality of light receiving elements, so that a light quantity per one light receiving element decreases and a detectable distance becomes shorter. Although it is required to amplify a signal of the light receiving element by an amplifying circuit in general, the number of amplifiers becomes larger and a cost becomes higher. This becomes remarkable as the layer number increases.

Therefore, the inventor conceives of the above-described embodiment and each modification in order to overcome such a problem.

According to an embodiment, it is possible to improve resolution in a detection range in a sub-scanning direction while inhibiting the increase of detection data obtaining time and the decrease of a detection distance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detecting device comprising:
a light source which includes a plurality of light emitting units arranged in an array in a sub-scanning direction and grouped into light emitting unit groups of non-adjacent light emitting units;
a deflector which deflects light from the light source to scan an area in a scanning direction; and
an optical detector which includes a plurality of light receiving units arranged in the sub-scanning direction so as to correspond to the plurality of light emitting units, and receives light deflected by the deflector and reflected by an object, wherein the non-adjacent light emitting units in each light emitting unit group are turned on simultaneously and at a different timing than the non-adjacent light emitting units in another light emitting unit group.

2. The object detecting device according to claim 1, wherein number of light emitting units is different from number of light receiving units.

3. The object detecting device according to claim 1, wherein the non-adjacent light emitting units of each light emitting unit group are electrically connected to each other.

4. The object detecting device according to claim 3, wherein each of the non-adjacent light emitting units in each light emitting unit group correspond to different light receiving units.

5. The object detecting device according to claim 1, wherein
each of the plurality of light emitting unit groups is turned on with a predetermined period, and
time after lighting of one light emitting unit group out of the plurality of light emitting unit groups finishes until lighting of a next light emitting unit group starts is shorter than the predetermined period.

6. The object detecting device according to claim 1, wherein the plurality of light receiving units includes a plurality of light receiving unit groups each formed of at least two light receiving units which are electrically connected to each other.

7. The object detecting device according to claim 6, wherein the at least two light receiving units are not adjacent to each other.

8. The object detecting device according to claim 6, wherein the at least two light receiving units correspond to different light emitting units.

9. The object detecting device according to claim 6, wherein lighting timings of the plurality of light emitting units are different from each other.

10. The object detecting device according to claim 9, wherein
   each of the plurality of light emitting units is turned on with a predetermined period, and
   time after lighting of one light emitting unit out of the plurality of light emitting units finishes until lighting of a next light emitting unit starts is shorter than the predetermined period.

11. The object detecting device according to claim 6, further comprising an amplifier commonly connected to the at least two light receiving units.

12. The object detecting device according to claim 1, further comprising amplifiers fewer than the light receiving units, wherein
   at least two light receiving units out of the plurality of light receiving units are connected to the same amplifier at different timings.

13. The object detecting device according to claim 1, wherein each of the plurality of light emitting units includes a plurality of minute light emitting bodies.

14. A sensing device comprising:
   the object detecting device according to claim 1; and
   a monitoring control device which obtains moving information including at least one of presence, a moving direction, and a moving speed of an object based on an output of the object detecting device.

15. The sensing device according to claim 14 mounted on a mobile object, wherein
   the monitoring control device determines whether there is danger based on at least one of positional information and the moving information of the object.

16. A mobile object device comprising:
   the sensing device according to claim 14; and
   a mobile object on which the sensing device is mounted.

17. A mobile object device comprising:
   the object detecting device according to claim 1; and
   a mobile object on which the object detecting device is mounted.

* * * * *